US011803215B2

United States Patent
Deck et al.

(10) Patent No.: US 11,803,215 B2
(45) Date of Patent: Oct. 31, 2023

(54) REMOVABLE DISPLAY AND CONTROL MODULE FOR A MEASURING DEVICE

(71) Applicant: VEGA Grieshaber KG, Wolfach (DE)

(72) Inventors: Thomas Deck, Wolfach (DE); Winfried Rauer, Fischerbach (DE); Juergen Motzer, Gengenbach (DE); Holger Staiger, Hardt (DE)

(73) Assignee: VEGA Grieshaber KG, Wolfach (DE)

( * ) Notice: Subject to any disclaimer, the term of this patent is extended or adjusted under 35 U.S.C. 154(b) by 78 days.

(21) Appl. No.: 17/421,599

(22) PCT Filed: Nov. 11, 2019

(86) PCT No.: PCT/EP2019/080796
§ 371 (c)(1),
(2) Date: Jul. 8, 2021

(87) PCT Pub. No.: WO2020/156697
PCT Pub. Date: Aug. 6, 2020

(65) Prior Publication Data
US 2022/0164008 A1    May 26, 2022

(30) Foreign Application Priority Data
Feb. 1, 2019 (DE) ...................... 10 2019 201 320.1

(51) Int. Cl.
*G06F 1/16* (2006.01)
*G06F 1/26* (2006.01)

(52) U.S. Cl.
CPC .......... *G06F 1/1683* (2013.01); *G06F 1/1607* (2013.01); *G06F 1/1698* (2013.01); *G06F 1/263* (2013.01)

(58) Field of Classification Search
CPC ...................................................... H05K 7/00
See application file for complete search history.

(56) References Cited

U.S. PATENT DOCUMENTS

| 9,507,381 B1 | 11/2016 | Vanderet et al. |
| 10,725,443 B2 | 7/2020 | Griech et al. |
| 2003/0198008 A1* | 10/2003 | Leapman ............ G06F 1/1671 361/679.08 |
| 2009/0310292 A1 | 12/2009 | Tian et al. |
| 2012/0152381 A1 | 6/2012 | Ungerer et al. |
| 2012/0162908 A1 | 6/2012 | Lo et al. |
| 2015/0039924 A1 | 2/2015 | Allgaier et al. |

(Continued)

FOREIGN PATENT DOCUMENTS

| DE | 10 2004 020 393 A1 | 11/2005 |
| DE | 20 2009 008 054 U1 | 9/2009 |

(Continued)

OTHER PUBLICATIONS

International Search Report dated Jan. 31, 2020 in PCT/EP2019/080796 filed Nov. 11, 2019, 2 pages.

(Continued)

*Primary Examiner* — Jerry Wu
(74) *Attorney, Agent, or Firm* — Oblon, McClelland, Maier & Neustadt, L.L.P.

(57) ABSTRACT

A detachable display and operating module for a field device with an energy storage device, an energy supply interface and a radio interface for wireless communication with the field device.

16 Claims, 1 Drawing Sheet

(56) References Cited

U.S. PATENT DOCUMENTS

2016/0357224 A1* 12/2016 Song ................ G06F 1/1626
2018/0314349 A1   11/2018 Jiang et al.

FOREIGN PATENT DOCUMENTS

| DE | 10 2012 012 430 A1 | 1/2014 |
| EP | 2 233 994 A2 | 9/2010 |
| EP | 2 829 929 A1 | 1/2015 |
| WO | WO 2014/000832 A1 | 1/2014 |

OTHER PUBLICATIONS

International Search Report and Written Opinion of the International Searching Authority dated Jan. 31, 2019 in PCT/EP2019/080796, (with English translation), 21 pages (International Search Report previously filed).
German Office Action dated May 23, 2019 in German Patent Application No. 10 2019 201 320.1, 7 pages.

* cited by examiner

REMOVABLE DISPLAY AND CONTROL MODULE FOR A MEASURING DEVICE

REFERENCE TO RELATED APPLICATIONS

This application claims priority to German Patent Application No. 10 2019 201 320.1, filed Feb. 1, 2019, which is incorporated herein by reference in its entirety.

FIELD OF INVENTION

The invention relates to a detachable display and operating module for a field device and to a field device having such a display and operating module.

BACKGROUND

Display and operating modules of measuring devices, which are also referred to as field devices in the following, are usually attached to the field device and connected to it via a cable, plug contacts or sliding contacts. The power supply and the communication between the field device and the display and operating module are operated via this cable.

SUMMARY

It is an object of the present invention to provide an alternative display and operating module for a measuring device for process automation in an industrial environment.

This object is solved by the subject matter of the independent claim. Further embodiments of the invention result from the subclaims and the following description.

A first aspect of the invention relates to a detachable display and operating module for a measuring device (field device). The measuring device may be, for example, a level measuring device, such as a level radar, a level detection device (level sensor), a flow measuring device or a pressure measuring device.

The removable display and operating module comprises an energy storage device that is configured to supply energy to the display and operating module when the display and operating module is removed from the field device and is not connected to the field device by a cable.

The energy storage device and the circuitry of the module may be dimensioned and set up in such a way that sparking outside the module is unlikely or even impossible. The smaller the energy storage device, the lower the risk of sparking may be. In principle, it may be advantageous to dimension the battery as small as possible for explosion protection. Currently, a capacity of 3 mWh for 15 minutes may be provided for Bluetooth communication.

Furthermore, a power supply interface is provided, which is configured to supply power to the display and operating module when the display and operating module is placed, screwed on or arranged in the field device, i.e. inserted or pushed in.

In addition, a radio interface may be provided that is configured for wireless communication with the field device, and in particular for receiving display data from the field device and for transmitting parameterization data to the field device. The radio interface is, for example, a short-range communication interface such as Bluetooth or ZigBee.

Alternatively or in addition to this, a data memory may be provided which comprises parameterization data for the field device by the display and operating module, as well as a control circuit which is set up so that the parameterization data is temporarily stored in the display and operating module and is only transferred to the field device and stored there when the display and/or operating module is reconnected to the field device.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and position of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

In particular, the display and operating module may have a user interface via which the user may enter parameterization data which is then transmitted to a corresponding control unit of the field device. The display and operating module may also have a display with the aid of which display data, in particular measurement data of the field device, can be shown to the user.

According to one embodiment of the invention, the detachable display and operating module comprises a control circuit configured to inhibit a supply of power to the display and operating module by the energy storage device when the display and operating module is placed on or in the field device. The term control circuit is to be interpreted broadly.

According to a further embodiment of the invention, the display and operating module comprises a wired communication interface that is set up for wired communication with the field device, and in particular for receiving display data from the field device and for transmitting parameterization data to the field device when the display and operating module is placed on or arranged in the field device.

It may be provided that only the wired communication interface is used when the display and operating module is placed on or in the field device. In this case, the radio interface is not used.

It may also be provided that the wired communication interface is used in addition to the radio interface when the display and operating module is placed on or in the field device. In this case, the data transmitted from the field device to the display and operating module can be transmitted simultaneously to an external, remote device.

According to a further embodiment of the invention, the wired communication interface corresponds to the power supply interface. For example, this is a two-wire line over which both data and power can be transmitted.

According to another embodiment of the invention, the energy supply interface is implemented as a wireless interface so that the energy storage device can be charged wirelessly when the display and operating module is placed on or in the field device.

According to a further embodiment of the invention, the display and operating module, and in particular the radio interface, is configured exclusively for short-range communication, which may also be advantageous for reasons of data security. This can ensure that the transmission power is severely limited. This may prove advantageous for providing explosion protection.

According to a further embodiment of the invention, the display and operating module, and in particular the radio interface, is configured for wireless communication with a further field device, for receiving display data from the further field device and for transmitting parameterization data to the further field device. Thus, the user may also communicate with other field devices, if necessary, after removing the display and operating module from the field device.

Another aspect of the invention relates to a field device comprising a removable display and operating module described above and below.

According to another embodiment, the field device comprises an opening for receiving the display and operating module.

Alternatively, the display and operating module may be placed on the field device or screwed onto it.

According to another embodiment of the invention, the field device comprises a field device cover that is arranged to receive the display and operating module.

A cavity may be provided in the field device cover or the housing of the field device into which the display and operating module is inserted.

The control circuitry of the display and operating module may be set up to detect whether the display and operating module is remote from the field device or is placed on top of or within the field device.

The field device lid may be configured to allow operation of the display and operating module by a user when the display and operating module is mounted or arranged in it. A transparent glass or plastic window may be provided for this purpose, under which the display and operating module is located.

Another aspect of the invention relates to the use of a detachable display and operating module described above and below for wireless operation of a field device and for wired and/or wireless power supply by the field device.

In the following, embodiments are described with reference to the figures. The illustrations in the figures are schematic and not to scale. If the same reference signs are used in the following description of the figures, these designate the same or similar elements.

DETAILED DESCRIPTION OF EMBODIMENTS

Figure 1:
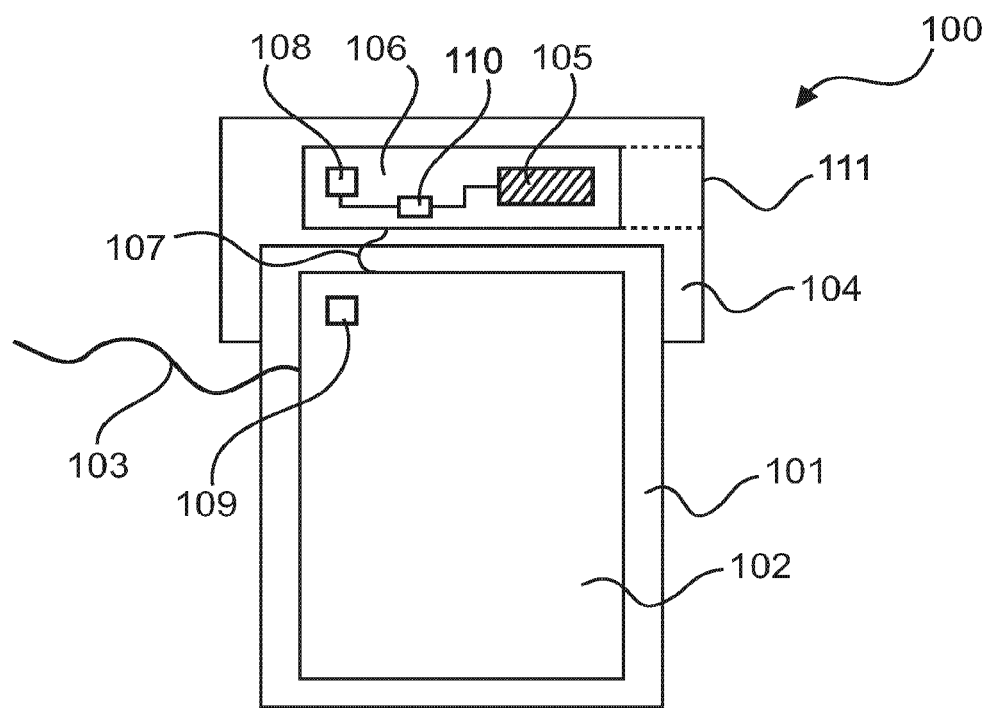
FIG. 1 shows a field device with inserted display and operating module.

FIG. 1 shows a field device 100 with a display and operating module 106 inserted into the field device lid 104. An opening 111 is provided in the field device lid for inserting the display and operating module 106.

The field device cover 104 is screwed onto the field device housing 101, for example. The field device housing 101 contains the field device electronics 102, for example measurement electronics for level measurement, level detection, flow measurement or pressure measurement. In particular, it has a radio interface 109 via which the field device electronics can communicate with the display and operating module 106.

For this purpose, the display and operating module 106 has a corresponding radio interface 108 that is connected to the control circuit 110. An energy storage device 105 is provided, for example in the form of a capacitor and/or a battery, which is also connected to the control circuit 110.

The wired power supply interface 107 can be used to supply power to the display and control device 106, and in particular the energy storage device 105, from the field device electronics when the display and control device 106 is attached to or located within the field device.

The supply line 103 is provided for the power supply of the field device electronics. In particular, this may be a two-wire line in the form of a 4 . . . 20 mA interface, via which the field device can also exchange data.

Figure 2:
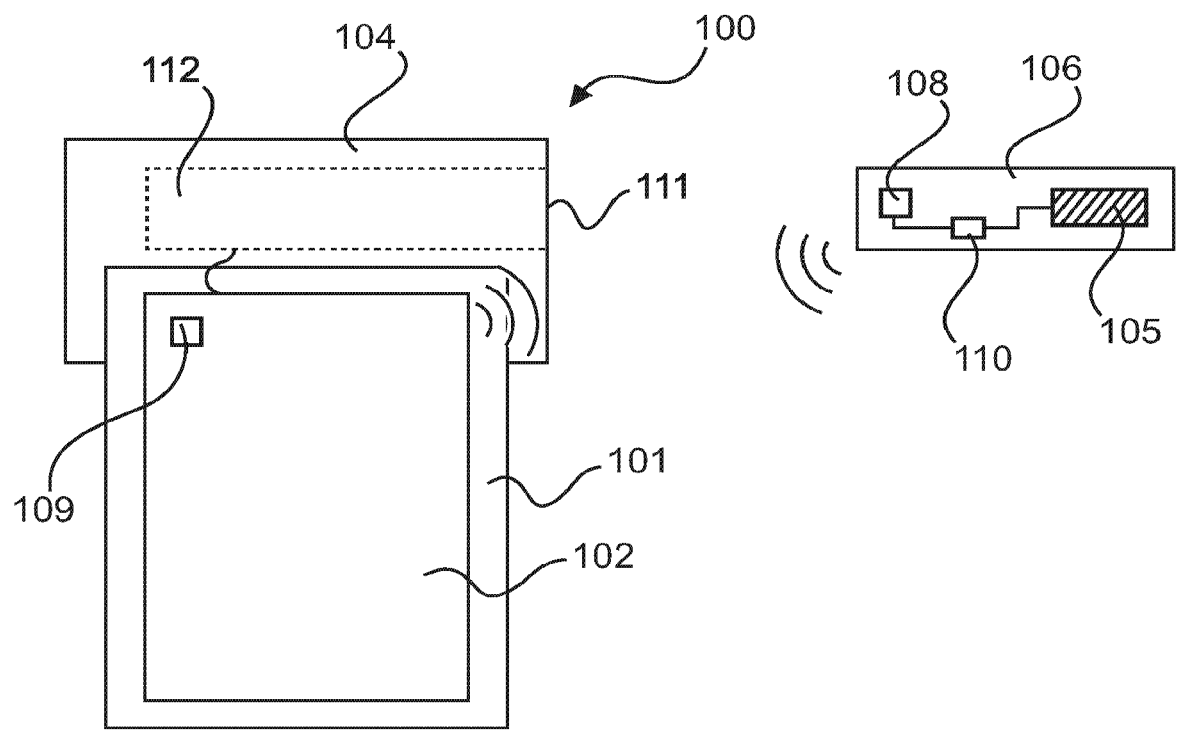
FIG. 2 shows the field device of FIG. 1 with a remote display and operating module.

FIG. 2 shows the field device of FIG. 1, whereby here the display and operating module 106 is arranged remotely. It can communicate wirelessly with the radio interface 109 of the field device electronics via the radio interface 108 and is supplied with the necessary energy by the energy storage 105.

The display and operating module 106 may include an additional power supply interface (not shown) through which it may be connected to an external power supply, even when not connected to or inserted in the field device.

Reference numeral 112 indicates the cavity in the field device cover 104 adapted to receive the display and operating module 106.

Since, depending on the installation situation, it can be tedious to make all settings directly on the field device, the display and operating module 106 can be removed for this purpose so that "remote", wireless parameterization and display reading can take place.

The display and operating module comprises an energy storage device 105 and a wireless connection to the field device 100.

If the display and operating module 106 is plugged onto or inserted into the field device, the energy storage device 105 is charged by it (wired or wireless charging). Communication between the field device and the display and operating module can be provided in plugged-in mode by radio, but also by wire.

When the display and operating module 106 is removed from the field device 100 and is no longer connected to the field device by a cable, the energy storage device 105 powers the display and operating module 106 and communication with the field device 100 is exclusively wireless.

Parameterization of the field device can thus be carried out in a much simpler environment. In particular, the display and operating module can be operated as a measured value indicator wirelessly, remotely from the field device, in order to have the measured value directly in view, for example, when changes are made to the tank.

Supplementally, it should be noted that "comprising" and "including" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A detachable display and operating circuit for a measuring device, comprising: a field device lid with an opening provided on a side for inserting the detachable display and operating circuit; a user interface configured to receive parameterization data entered by a user; a display configured to show display data of the measuring device; an energy storage device configured to supply energy to the detachable display and operating circuit when the detachable display and operating circuit is detached from the measuring device; a wired power supply interface connected from a field device housing to another side of the field device lid and configured to supply power to the detachable display and operating circuit from the field device housing when the detachable display and operating circuit is placed in the field device lid; a data memory configured to temporarily store the parameterization data entered by the user; in a detached mode, a radio interface configured to wirelessly communicate with a radio interface in the field device housing of the measuring device, to receive the display data from the measuring device and to transmit the parameterization data entered by the user and stored in the data memory to the measuring device; and in an attached mode, a control circuit configured to transfer the parameterization data entered by the user and stored in the data memory from the detachable display and operating circuit to the measuring device when the detachable display and operating circuit is inserted and reconnected to the field device lid of the measuring device.

2. The detachable display and operating circuit of claim 1, wherein the control circuit is further configured to inhibit a power supply to the detachable display and operating circuit from the energy storage device when the detachable display and operating circuit is placed on or in the measuring device.

3. The detachable display and operating circuit according to claim 1, further comprising:
a wired communication interface configured to communicate with the measuring device via a wired connection, receive display data from the measuring device, and transmit parameterization data to the measuring device when the detachable display and operating circuit is placed on or in the measuring device.

4. The detachable display and operating circuit according to claim 1,
wherein the display and operating circuit is configured to exclusively implement short- range communication.

5. The detachable display and operating circuit according to claim 3,
wherein the detachable display and operating circuit is further configured to wirelessly communicate with a further measuring device,
receive display data from the further measuring device, and
transmit parameterization data to the further measuring device.

6. A measuring device comprising:
the detachable display and operating circuit according to claim 1.

7. The measuring device according to claim 6, further comprising:
an opening that receives the detachable display and operating circuit.

8. The measuring device according to claim 6, further comprising:
a field device cover that receives the detachable display and operating circuit.

9. The measuring device according to claim 6, wherein the measuring device is configured as a level measuring device, pressure measuring device, point level sensor, or flow measuring device.

10. The detachable display and operating circuit according to claim 1, further comprising:
a wired communication interface configured to:
communicate with the measuring device via a wired connection,
receive display data from the measuring device, and
transmit parameterization data to the measuring device when the detachable display and operating circuit is placed on or in the measuring device.

11. The detachable display and operating circuit according to claim 2,
wherein the display and operating circuit is configured to exclusively implement short- range communication.

12. The detachable display and operating circuit according to claim 3,
wherein the display and operating circuit is configured to exclusively implement short- range communication.

13. The detachable display and operating circuit according to claim 1,
wherein the display and operating circuit is configured to exclusively implement short- range communication.

14. The detachable display and operating circuit according to claim 1,
wherein the display and operating circuit is configured to exclusively implement short- range communication.

15. A measuring method implemented by a detachable display and operating circuit for a measuring device, the method comprising: providing a field device lid with an opening provided on a side for inserting the detachable display and operating circuit; receiving, via a user interface, parameterization data entered by a user; showing, using a display, display data of the measuring device; supplying energy, using an energy storage device, to the detachable display and operating circuit when the detachable display and operating circuit is removed from the measuring device; supplying power, using a wired power supply interface connected from a field device housing to another side of the field device lid, to the detachable display and operating circuit by the measuring device when the detachable display and operating circuit is placed in the field device lid in a detached mode, wirelessly communicating, using a radio interface, with a radio interface in the field device housing of the measuring device, receiving, using the radio interface, the display data from the measuring device, and transmitting, using the radio interface, the parameterization data entered by the user and stored in a data memory to the measuring device; and in an attached mode, temporarily storing, in the data memory, the parameterization data entered by the user and transferring, using the control circuit, the parameterization data entered by the user and stored in the data memory from the detachable display and operating circuit to the measuring device when the detachable display and operating circuit is inserted and reconnected to the field device lid of the measuring device.

16. The measuring method according to claim 15, further comprising: storing the parameterization data in the measuring device in response to the transferring of the parameterization data from the detachable display and operating circuit when the detachable display and operating circuit is reconnected to the measuring device.

* * * * *